US012699238B2

(12) United States Patent
Chin-Tsung

(10) Patent No.: US 12,699,238 B2
(45) Date of Patent: Aug. 4, 2026

(54) PASSIVE OPTICAL NETWORK DUAL SYSTEM MODULE

(71) Applicant: EZCONN CORPORATION, New Taipei City (TW)

(72) Inventor: Wu Chin-Tsung, New Taipei City (TW)

(73) Assignee: EZCONN CORPORATION, New Taipei City (TW)

( * ) Notice: Subject to any disclaimer, the term of this patent is extended or adjusted under 35 U.S.C. 154(b) by 570 days.

(21) Appl. No.: 17/984,520

(22) Filed: Nov. 10, 2022

(65) Prior Publication Data

US 2023/0141411 A1 May 11, 2023

(30) Foreign Application Priority Data

Nov. 10, 2021 (TW) ................................. 110213224

(51) Int. Cl.
 *H04B 10/00* (2013.01)
 *G02B 6/42* (2006.01)

(52) U.S. Cl.
 CPC ................................. *G02B 6/4246* (2013.01)

(58) Field of Classification Search
 CPC ............. G02B 6/4246; G02B 6/29362; G02B 6/4214; G02B 6/4215; H04B 10/2589
 See application file for complete search history.

(56) References Cited

U.S. PATENT DOCUMENTS

| | | | | |
|---|---|---|---|---|
| 4,904,043 A * | 2/1990 | Schweizer | ........... | G02B 6/4246 385/35 |
| 6,493,121 B1 * | 12/2002 | Althaus | ................ | G02B 6/4246 398/139 |
| 7,438,480 B2 * | 10/2008 | Okada | .................. | G02B 6/4215 385/35 |
| 7,486,891 B1 * | 2/2009 | Yao | .................... | G02B 6/29365 398/79 |
| 9,435,711 B2 * | 9/2016 | Wu | .................... | G01M 11/3109 |
| 9,851,515 B1 * | 12/2017 | Chien | .................. | G02B 6/4228 |
| 10,900,867 B2 * | 1/2021 | Kuznia | .............. | G01M 11/3154 |
| 10,921,535 B1 * | 2/2021 | Wu | ...................... | G02B 6/0026 |
| 11,184,088 B2 * | 11/2021 | Li | ......................... | G02B 6/4246 |
| 11,860,419 B2 * | 1/2024 | Ge | ..................... | G02B 6/29353 |
| 11,916,600 B2 * | 2/2024 | Li | ......................... | G02B 6/4263 |
| 12,224,793 B2 * | 2/2025 | Wu | .................... | G01M 11/3154 |
| 2003/0063844 A1 * | 4/2003 | Caracci | .................... | G02B 6/32 385/24 |
| 2004/0208601 A1 * | 10/2004 | Tan | ........................ | H04B 10/43 398/135 |

(Continued)

*Primary Examiner* — Agustin Bello
(74) *Attorney, Agent, or Firm* — RANKIN, HILL & CLARK LLP

(57) ABSTRACT

A passive optical network dual system module includes a light guide unit, an optical path conversion unit and an optical transceiver unit. The light guiding unit is connected to the optical fiber and is suitable for transmitting optical signals. The optical path conversion unit is connected to the light guide unit, and is suitable for receiving optical signals and changing the optical path of the optical signals. It is used in the optical transceiver unit for the configuration of two receiving parts and two transmitting parts, which can support the same optical path at the same time with use of two sets of communication protocol systems.

8 Claims, 6 Drawing Sheets

(56) References Cited

U.S. PATENT DOCUMENTS

| | | | | |
|---|---|---|---|---|
| 2006/0083514 A1* | 4/2006 | Liu | G02B 6/4246 | 398/85 |
| 2006/0088255 A1* | 4/2006 | Wu | G02B 6/4215 | 385/92 |
| 2007/0122154 A1* | 5/2007 | Nakanishi | G02B 6/4246 | 398/85 |
| 2007/0297809 A1* | 12/2007 | Okada | H04B 10/40 | 398/164 |
| 2008/0031574 A1* | 2/2008 | Tanaka | H05K 1/189 | 385/88 |
| 2010/0061730 A1* | 3/2010 | Seki | G02B 6/4246 | 398/79 |
| 2010/0150571 A1* | 6/2010 | Nakanishi | G02B 6/3861 | 264/1.25 |
| 2011/0052125 A1* | 3/2011 | Lee | G02B 6/4271 | 385/88 |
| 2011/0058771 A1* | 3/2011 | Lee | G02B 6/4215 | 385/33 |
| 2012/0288244 A1* | 11/2012 | Wu | G02B 6/4277 | 385/94 |
| 2012/0321258 A1* | 12/2012 | Kihara | G02B 6/4228 | 385/93 |
| 2013/0004132 A1* | 1/2013 | Chiu | G02B 6/4201 | 156/293 |
| 2013/0022313 A1* | 1/2013 | Chen | H04B 10/40 | 156/60 |
| 2013/0089337 A1* | 4/2013 | Kim | G02B 6/4246 | 398/139 |
| 2013/0107265 A1* | 5/2013 | Wu | H04B 10/071 | 356/445 |
| 2013/0121650 A1* | 5/2013 | Mizobuchi | G02B 6/4246 | 385/89 |
| 2013/0128594 A1* | 5/2013 | Chien | G02B 6/4215 | 362/365 |
| 2013/0251316 A1* | 9/2013 | Okada | G02B 6/4237 | 385/92 |
| 2013/0330040 A1* | 12/2013 | Wu | G02B 6/4246 | 385/36 |
| 2014/0099055 A1* | 4/2014 | Chen | G02B 6/12004 | 385/33 |
| 2014/0355997 A1* | 12/2014 | Miao | H04B 10/40 | 398/135 |
| 2015/0229390 A1* | 8/2015 | Chi | H04B 10/077 | 398/34 |
| 2017/0059394 A1* | 3/2017 | Ho | G01J 1/0271 | |
| 2017/0063465 A1* | 3/2017 | Lin | H01S 5/4012 | |
| 2017/0090121 A1* | 3/2017 | Wang | G02B 6/4215 | |
| 2017/0261707 A1* | 9/2017 | Onaka | H04B 10/40 | |
| 2018/0284369 A1* | 10/2018 | Lin | G02B 6/4224 | |
| 2019/0103919 A1* | 4/2019 | Hailai | G02B 6/4246 | |
| 2020/0081203 A1* | 3/2020 | Kihara | G02B 6/4206 | |
| 2021/0141235 A1* | 5/2021 | Kang | G02B 6/4263 | |
| 2021/0148786 A1* | 5/2021 | Kang | G01M 11/3136 | |
| 2022/0158737 A1* | 5/2022 | Tomita | G02B 6/3822 | |
| 2022/0360326 A1* | 11/2022 | Wu | H04B 10/40 | |
| 2023/0026205 A1* | 1/2023 | Ge | G02B 6/2856 | |
| 2023/0141411 A1* | 5/2023 | Chin-Tsung | G02B 6/4246 | 385/33 |

* cited by examiner

PASSIVE OPTICAL NETWORK DUAL SYSTEM MODULE

RELATED APPLICATIONS

This application is a non-provisional of, claims the benefit and priority of Taiwan (R.O.C) Application No. 110213224, filed Nov. 10, 2021, which is incorporated herein by reference in its entirety.

TECHNICAL FIELD

The present invention relates to an optical module. More particularly, the invention relates to a passive optical network dual system module which can be applied to both systems.

BACKGROUND

To face the advent of a highly information-based society, communication infrastructure is needed to transmit various kinds of information, such as voice, text, data, images, etc. Accordingly, the optical communication network was developed to replace the conventional copper cable networks for huge information transmission. As known, in the field of optical communication, the optical fiber is especially suitable for serving as the medium for light transmission over long distances due to its advantages of low loss and wide bandwidth.

Based on the above advantages, optical detection technology using optical fiber has also become one of the commonly used communications technologies. In optical communication systems, light is used to transmit data to remote ends through optical fibers in the form of light pulses rather than electrical current. Optical fiber transceivers are an important part of communication systems and can be classified according to fiber mode, transmission rate, transmission distance, wavelength and connector type. In the field of optical fiber cable communication, the optical transmission module (Transceiver) has the role of linking the past and the future. Its main function is to convert optical signals into electrical signals, or convert electrical signals into optical signals. One of the optical transmission module type transceivers is a bidirectional transceiver (BiDi), and the main component of is a bi-directional Optical Sub-Assembly (BOSA).

Generally, BOSA is made up of light emitter, wherein said light emitter has like laser diode, has the light receiver of light receiving source, can let the light of one wavelength pass but reflect another at the same time. A wavelength optical filter, and an optical transmitter capable of simultaneously outputting the emitted light and inputting the received light, and the above-mentioned components are all covered by a casing. After passing through the optical transmitter, the Tx data is transmitted to the optical fiber in the optical connector through the wavelength filter, and the Rx data is transmitted to the optical receiver through the filter after passing through the optical fiber.

For example, one of an optical transmission sub-module is shown as FIG. 1. In FIG. 1, the optical transmission sub-module 1 includes an optical transmitter 11 capable of outputting and receiving light at the same time and an optical receiver 12 having a light receiving source. In other words, this structure is only suitable for one system of communication protocols. As the demand for data transmission speed increases, the old network system needs to be upgraded to the new system to load a large amount and fast data transmission, and there is a handover period during the upgrade process, that is, during the upgrade process, it needs to serve users who maintain the old network system and upgrade to the new network system at the same time. When there are two systems for the modem in the office building or the transfer station, it is impossible to use one modem to solve it. Therefore, improving the structure of the optical transmission sub-module to cope with the situation of serving two systems at the same time has become an important issue to be considered in the field of optical fiber cable communication.

In view of the above, there are many bottlenecks in the prior art, the present invention overcomes the above problems, and proposes a practical passive optical network dual system module.

SUMMARY

One purpose of the present invention is to provide a kind of passive optical network dual system module, this module can simultaneously support the use of two communication systems, to solve the problem of needing to rearrange optical fiber transmission line and replace data machine.

Another object of the present invention is to provide a kind of passive optical network dual system module, this module can simultaneously install two groups of receiving parts and transmitting parts in the narrow space, to solve the problem that only one group receiver and transmitter can be set in a module.

To achieve the above-mentioned purpose, the present invention proposes a passive optical network dual system module, the passive optical network dual system module comprises a light guide unit, an optical path conversion unit and an optical transceiver unit. The light guiding unit is connected to an optical fiber and is suitable for transmitting an optical signal, and the optical signal is not a single wavelength. The light path conversion unit is connected to the light guide unit and is suitable for receiving the light signal and changing the light path of the light signal. The light path conversion unit sequentially includes a first one along the direction toward the light guide unit. a collimating lens, a first filter, a second filter, a second collimating lens, a third filter, and a fourth filter, wherein the first collimating lens is disposed on the light guide unit and the light path conversion unit, the second collimating lens is arranged between the second filter and the third filter, wherein the first collimating lens and the second collimating lens make the light The signal forms parallel light. The optical transceiver unit is suitable for receiving and transmitting the optical signal, and is suitable for two sets of communication protocol systems. The optical transceiver unit includes a first receiving element, a second receiving element, a third transmitting element and a fourth transmitting element pieces. The first receiving element is set corresponding to the first filter. The second receiver is arranged corresponding to the second filter. The third emitting element is set corresponding to the third filter. The fourth emitting element is set corresponding to the fourth filter. The first receiving member and the second receiving member are respectively disposed corresponding to one of the third transmitting member and the fourth transmitting member.

In some embodiments, when the optical signal is transmitted to the first filter, the incident angle of the optical signal entering the first filter is 45 degrees.

In some embodiments, when the optical signal is transmitted to the second filter, the incident angle of the optical signal entering the second filter is 45 degrees.

In some embodiments, when the optical signal is transmitted to the third filter, the incident angle of the optical signal entering the third filter is 20 to 30 degrees.

In some embodiments, when the optical signal is transmitted to the fourth filter, the incident angle of the optical signal entering the fourth filter is 15 to 25 degrees.

In some embodiments, the receiving wavelength range of the first receiving element is between 1575 nm and 1580 nm.

In some embodiments, the receiving wavelength range of the second receiving element is between 1490 nm and 1500 nm.

In some embodiments, the emission wavelength range of the third emitting element is between 1300 nm and 1320 nm.

In some embodiments, the emission wavelength range of the fourth emitting element is between 1260 nm and 1280 nm.

In some embodiments, the difference in the emission wavelength range between the third emitting element and the fourth emitting element is not greater than 60 nm.

To achieve the above-mentioned purpose, the present invention proposes another passive optical network dual system module, and the passive optical network dual system includes a light guide unit, an optical path conversion unit and an optical transceiver unit. The light guiding unit is connected to an optical fiber and is suitable for transmitting an optical signal, and the optical signal is not of a single wavelength. The light path conversion unit is connected to the light guide unit and is suitable for receiving the light signal and changing the light path of the light signal. The light path conversion unit sequentially includes a first one along the direction toward the light guide unit. Collimating lens, a first filter, a second filter, a second collimating lens and a combination third filter, wherein the first collimating lens and the second collimating lens make the optical signal parallel Light. The optical transceiver unit is suitable for receiving and transmitting the optical signal, and is suitable for two sets of communication protocol systems. The optical transceiver unit includes a first receiving element, a second receiving element, a third transmitting element and a fourth transmitting element pieces. The first receiver is set corresponding to the first filter. The second receiver is arranged corresponding to the second filter. The third emitting element is set corresponding to the third filter. The fourth emitting element is set corresponding to the third filter. Wherein, the first receiving element and the second receiving element are respectively disposed corresponding to one of the third transmitting element and the fourth transmitting element.

In some embodiments, when the optical signal is transmitted to the first filter, the incident angle of the optical signal entering the first filter is 45 degrees.

In some embodiments, when the optical signal is transmitted to the second filter, the incident angle of the optical signal entering the second filter is 45 degrees.

In some embodiments, when the optical signal is transmitted to the combination third filter, the incident angle of the optical signal entering the combination third filter is 45 degrees.

In some embodiments, the receiving wavelength range of the first receiving element is between 1575 and 1580 nm.

In some embodiments, the receiving wavelength range of the second receiving element is between 1480 nm and 1500 nm.

In some embodiments, the emission wavelength range of the third emitting element is between 1300 nm and 1320 nm.

In some embodiments, the emission wavelength of the fourth emitting element ranges from 1260 nm to 1280 nm.

In some embodiments, the difference in the emission wavelength range between the third emitting element and the fourth emitting element is not greater than 60 nm.

Accordingly, the present invention provides proposes a passive optical network dual system module, which is used in the optical transceiver unit to carry out the configuration of two receiving parts and two transmitting parts, and can be simultaneously on the same optical path. Supports the use of two sets of communication protocols. In addition, by setting the angle of each filter in the optical path conversion unit, two sets of receivers and transmitters can be installed in a narrow space, which not only does not increase the overall occupied space, but also maintains a good signal transmission effect.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of heatsink fins incorporating aspects of the presently disclosed principles are illustrated by way of example, and not by way of limitation.

DETAILED DESCRIPTION

Figure 1:
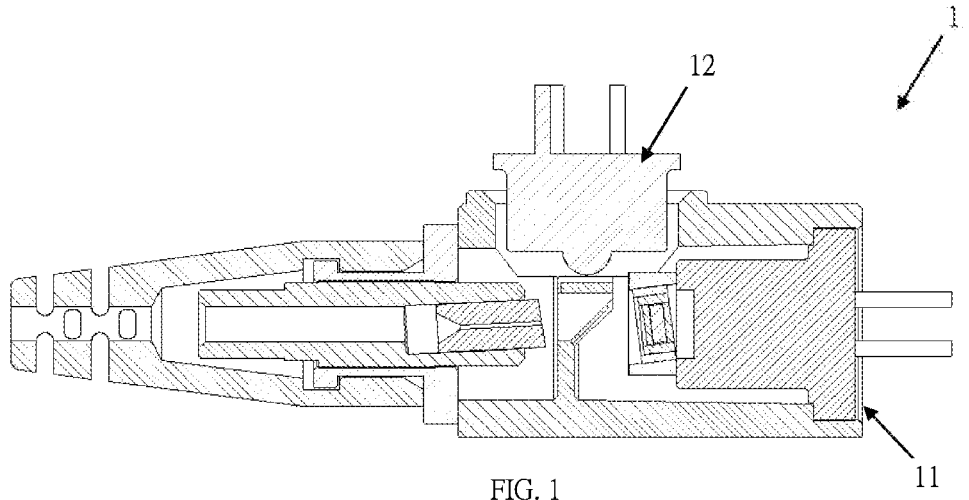
FIG. 1 depicts an optical transmission sub-module of the prior art.

To solve the problems in prior art, an optical inspection device is disclosed in the present invention. The optical inspection device of the present invention can detect and/or inspect different positions of an object at the same time without significant changes of the structure and/or element of the interferometer, and can obtain the coherence effect optical information of different optical path. Thus, the optical information can be processed and analyzed. Also, the present invention can be applied to various field of inspection and/or detection, particularly in biological detection/inspection, industrial detection/inspection, semiconductor industrial detection/inspection and so on.

Unless specified otherwise, the accompanying drawings illustrate aspects of the innovative subject matter described herein. Referring to the drawings, wherein like reference numerals indicate similar parts throughout the several views, several examples of coaxial cable connector incorporating aspects of the presently disclosed principles are illustrated by way of example, and not by way of limitation.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The embodiment disclosed in this case is a passive optical network dual system module. For example, the passive optical network dual system module can be installed in the optical network unit (ONU) at the customer end of the passive optical network (PON) system. This system is fiber to the curb (FTTC), fiber to the building (FTTB) or fiber-to-the-home (FTTH) systems, using point-to-multipoint network architecture and FTTC, FTTB, FTTH systems and equipment used in remote user residences.

Figure 2:
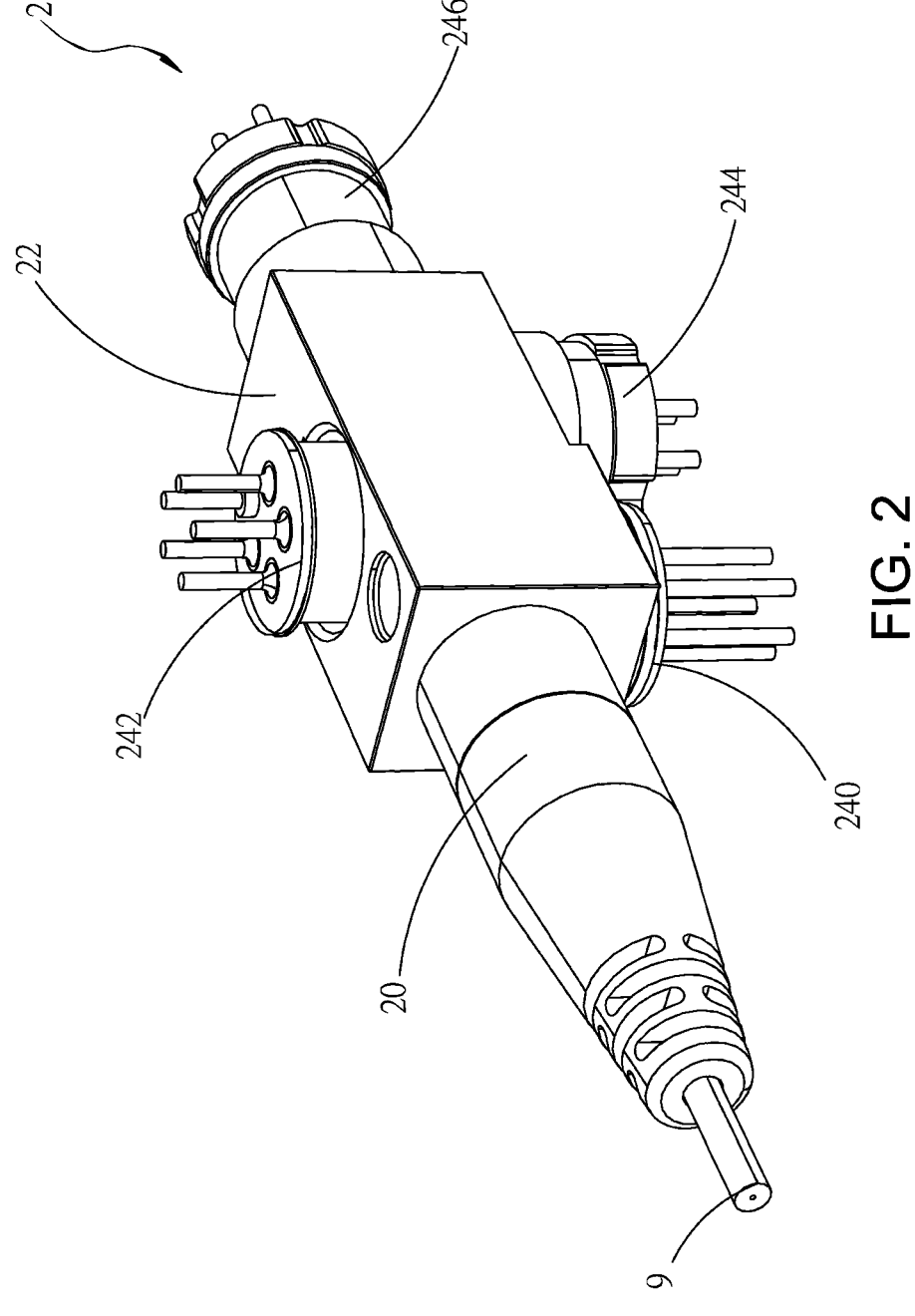
FIG. 2 depicts a passive optical network dual system module according to various embodiments of this invention.

First, the structural appearance and preliminary functions of the passive optical network dual system module in this case will be described. Please refer to FIG. 2, which is a schematic structural diagram of the passive optical network dual system module of the present invention. The passive optical network dual system module 2 includes a light guide unit 20, an optical path conversion unit 22 and an optical transceiver unit. The light guide unit 20 is connected to the optical fiber 9, and the light guide unit 20 is adapted to output optical signals. The light path conversion unit 22 is connected to the light guide unit 20 and is adapted to receive the light signal and change the light path of the light signal. The optical transceiver unit is suitable for receiving and transmitting optical signals. The optical transceiver unit includes a first receiving element 240, a second receiving element 242, a third transmitting element 244 and a fourth transmitting element 246. The first receiving element 240 and the second receiving element 242 are disposed corresponding to one of the third transmitting element 244 and the fourth transmitting element 246, respectively. In other words, the receiving element and the transmitting element are arranged in pairs, and the installation positions of the receiving element and the transmitting element in FIG. 2 are only schematic diagrams in the embodiment, and the actual installation positions are still determined according to the layout requirements.

Figure 3:
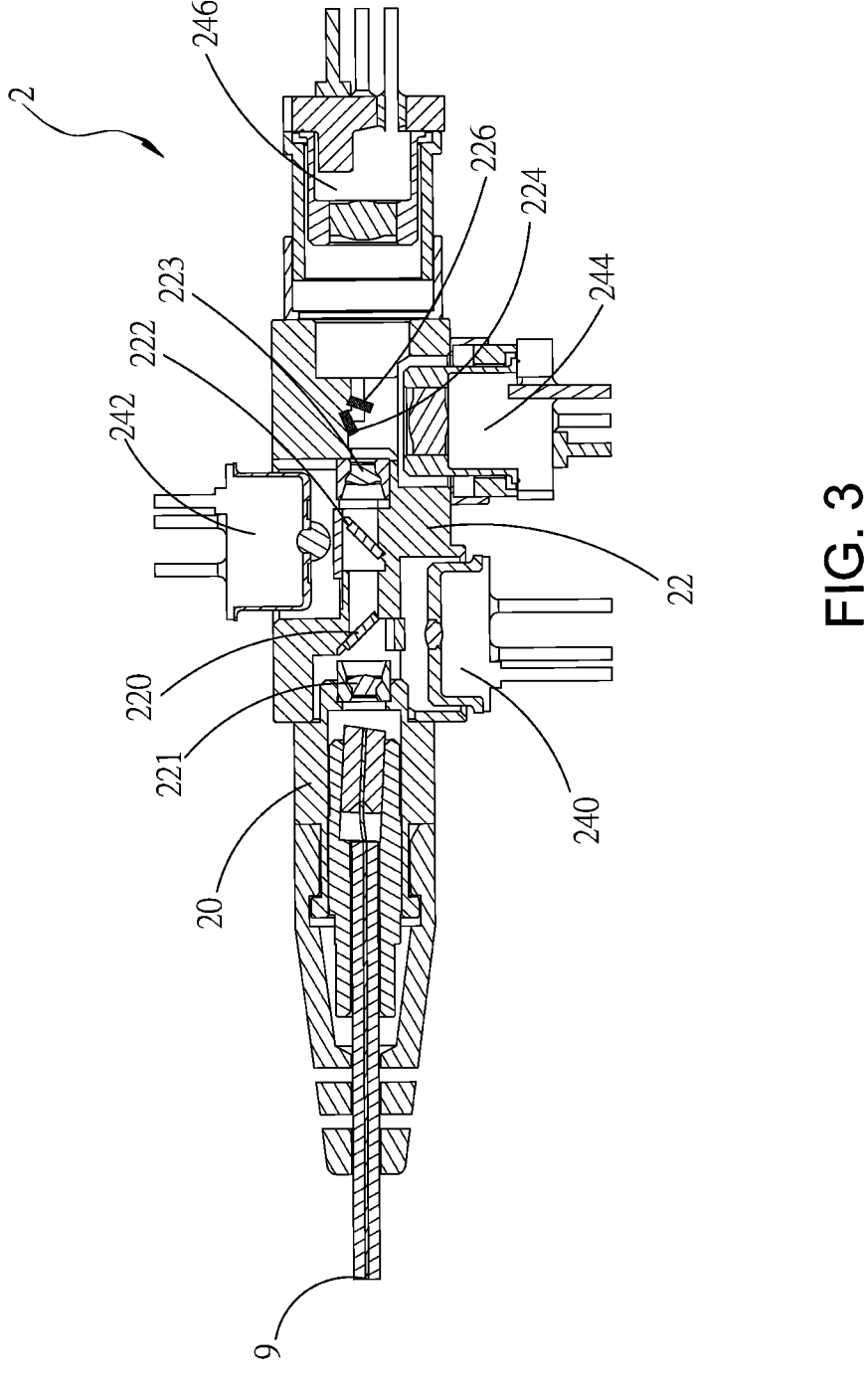
FIG. 3 depicts a cross-section of a passive optical network dual system module according to various embodiments of this invention.

Next, the internal structure of the passive optical network dual system module of the present case is further disclosed through a cross-sectional view. Please refer to FIG. 3. FIG. 3 is a schematic structural diagram of a cross-section of the passive optical network dual system module of the creation. The passive optical network dual system module 2 includes a light guide unit 20, an optical path conversion unit 22 and an optical transceiver unit. The light path conversion unit 22 is connected to the light guide unit 20 and includes a first collimating lens 221, a first filter 220, a second filter 222, and a second collimator in sequence along the direction toward the light guide unit 20, lens 223 third filter 224, fourth filter 226. The optical transceiver unit includes a first receiving element 240, a second receiving element 242, a third transmitting element 244 and a fourth transmitting element 246. Among them, the first receiving part 240 is set corresponding to the first filter 220. The second receiving part 242 is set corresponding to the second filter 222. The third transmitting part 244 is set corresponding to the third filter 224. The fourth transmitting part 246 is set The setting corresponds to the fourth filter 226. The first collimating lens 221 and the second collimating lens 223 make the light signal form parallel light.

The design positions of the above-mentioned filters, receiving parts and transmitting parts will be further described here. It should be noted that, because the device that can install the module of this case is usually located in a relatively narrow space, how to simplify the arrangement of components and reduce the overall space while achieving a good balance is the main consideration when designing the position of the above-mentioned components. In this case, the primary consideration is whether the transmission path of the optical signal is blocked. Once the optical signal is blocked, the transmission effect will be reduced. Therefore, it is necessary to provide a suitable installation space for the receiver and/or the transmitter. However, the movement of any receiver and/or transmitter will increase the collision between components. In addition, when moving the receiving element and/or the transmitting element, the collimating lens and filter inside the optical path conversion unit also need to be adjusted accordingly. In order to reduce the effect of the light spot affecting the signal transmission, the filter at the transmitting end is usually Installed near the light focusing point of the emitting element, the small spot filter can be used in a small size to save space. Therefore, under the consideration of layers, the design of components in the light adjustment unit is a big challenge.

Figure 4:
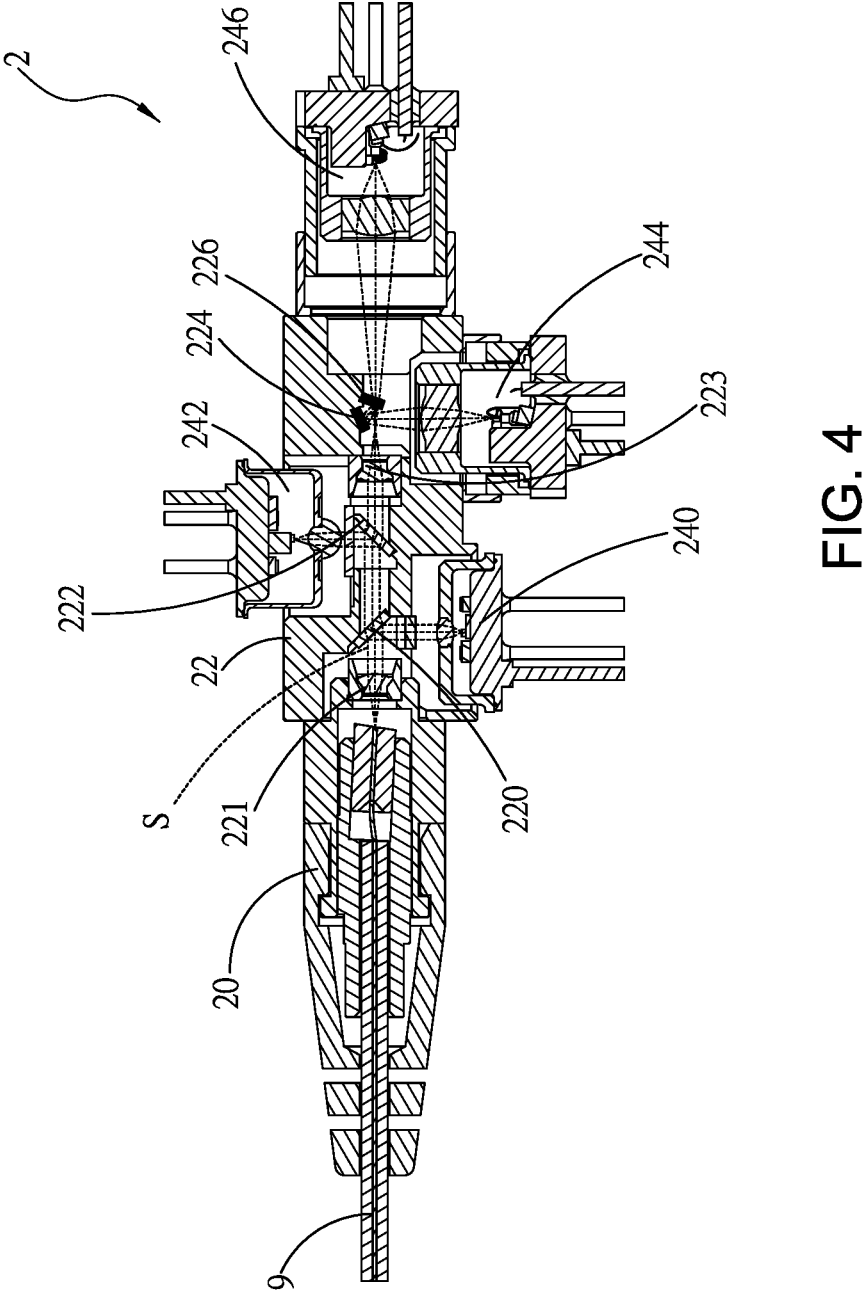
FIG. 4 depicts a cross-section including an optical path of a passive optical network dual system module according to various embodiments of this invention.

Under the above considerations, the detailed path of the light in the optical path conversion unit will be further described here. Please continue to refer to FIG. 3, and please refer to FIG. 4 at the same time. A schematic structural diagram of a cross-section of the system module including the optical path. Since the filtering wavelength of each filter is determined by the requirements of the receiving element and/or the transmitting element corresponding to the filter, only the angle of each filter is described in this case. The way of defining the filter angle is determined by the angle at which the light is incident on the filter. That is, in the passive optical network dual system module 2 described in this case, when the optical signal S (dotted line) is transmitted to the first filter 220, the incident angle of the optical signal S entering the first filter 220 is 45 degrees. When the optical signal S is transmitted to the second filter 222, the incident angle of the optical signal S entering the second filter 222 is 45 degrees; when the optical signal S is transmitted to the third filter 224, the optical signal S enters the third filter 224 The incident angle of S is 20 to 30 degrees, and in this embodiment, it is 25 degrees. When the optical signal is transmitted to the fourth filter 226, the incident angle of the optical signal S entering the fourth filter 226 is 15 to 25 degrees. In this embodiment, 20 degrees is exemplified.

Figure 5:
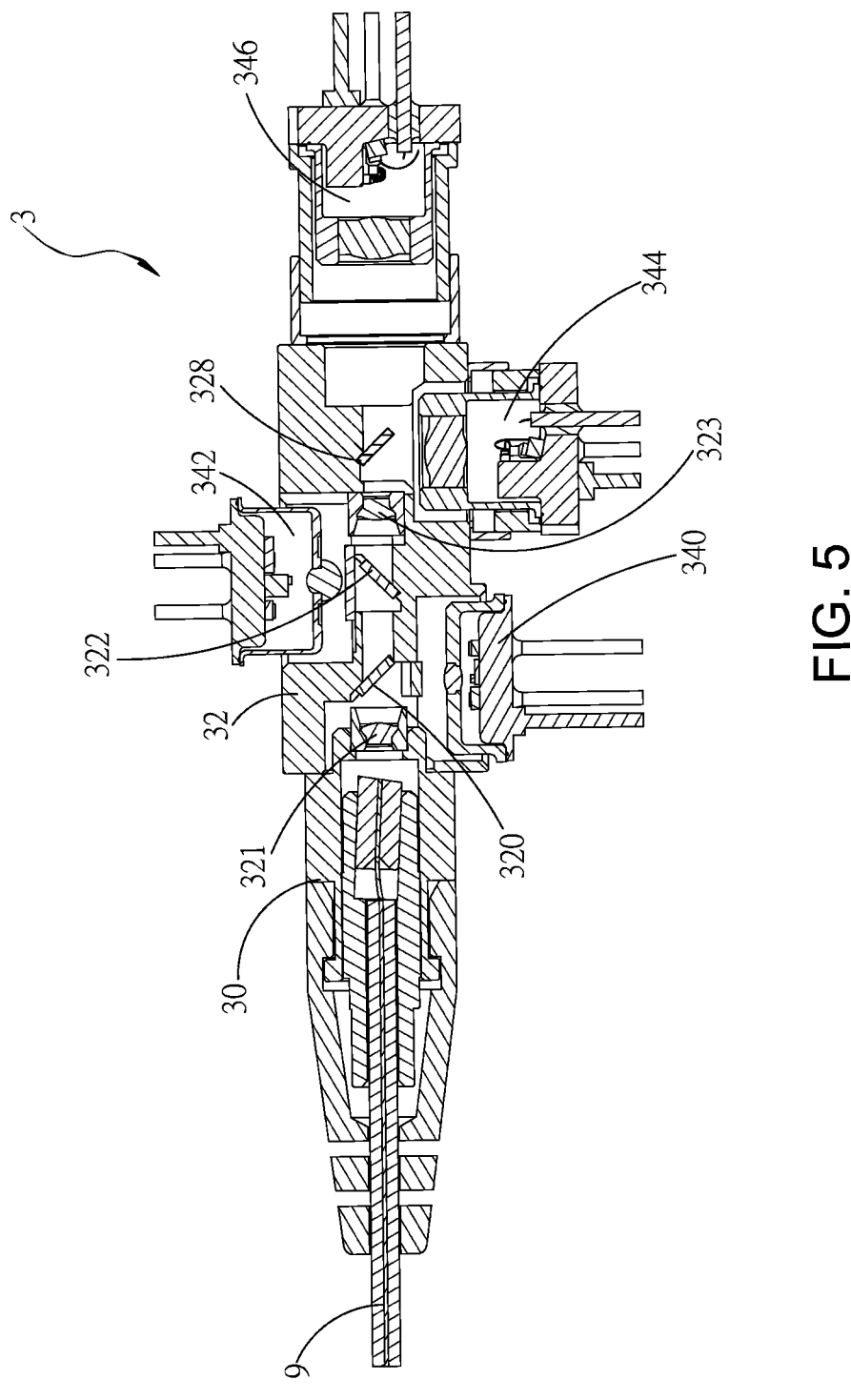
FIG. 5 depicts a cross-section of the passive optical network dual system module according to various embodiments of this invention.
Figure 6:
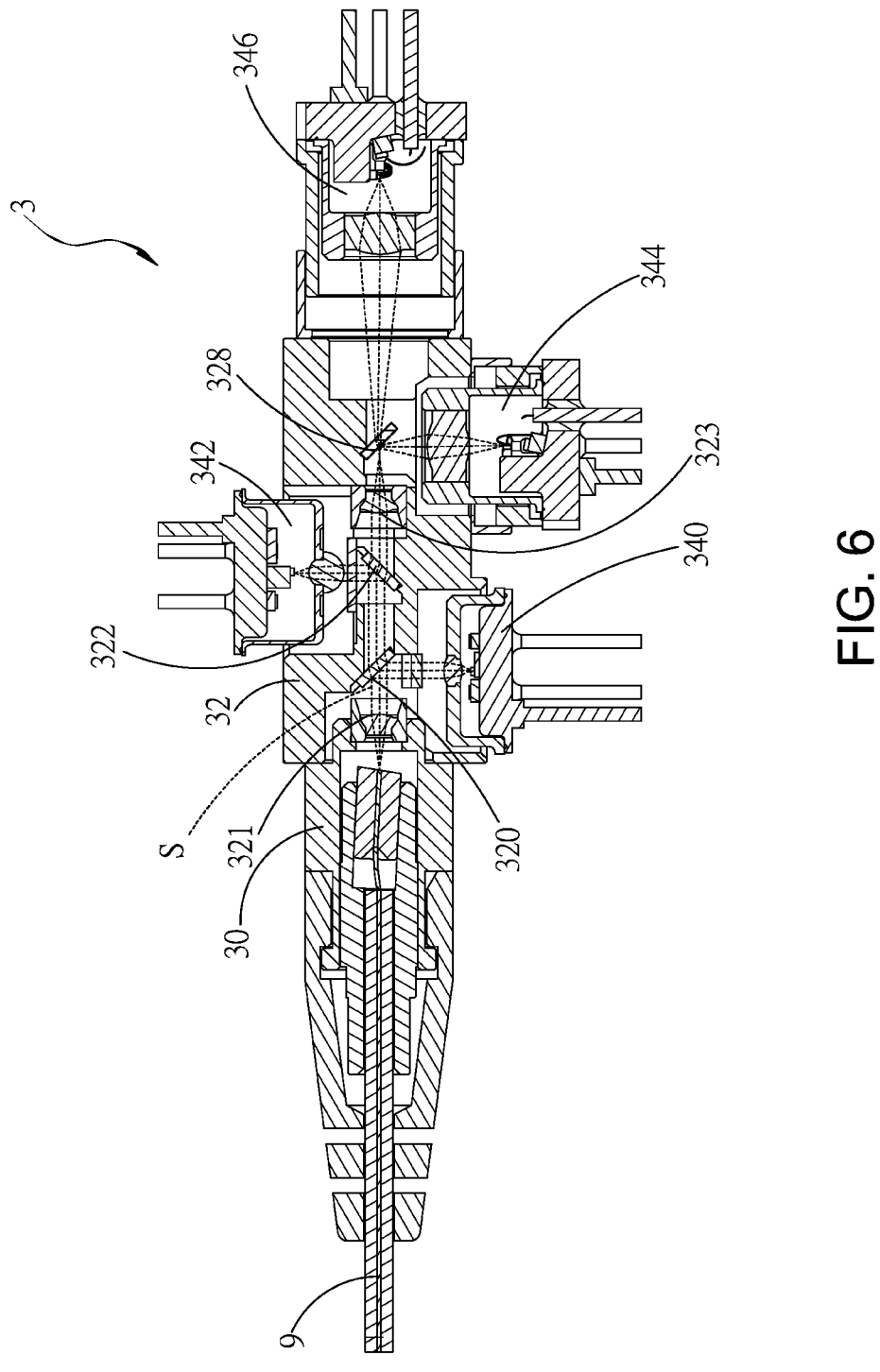
FIG. 6 depicts a cross-section including an optical path of the passive optical network dual system module according to various embodiments of this invention.

The passive optical network dual system module of the present invention provides another embodiment, please refer to FIG. 5, and please refer to FIG. 6 at the same time. FIG. 5 is a schematic structural diagram of a cross-section of the passive optical network dual system module 3 created. FIG. 6 is a schematic structural diagram of a cross-section including an optical path of the passive optical network dual system module 3 created. The passive optical network dual system module 3 includes a light guide unit 30, an optical path conversion unit 32 and an optical transceiver unit. The light path conversion unit 32 is connected to the light guide unit 30 and includes a first collimating lens 321, a first filter 320, a second filter 322, and a second collimator 323 in sequence along the direction of the light guide unit 30, a lens 323, and a combination third filter 328 (the third filter 328 is a combination of the third filter 224 and the fourth filter 226 of the light path conversion unit 22). The optical transceiver unit includes a first receiving element 340, a second receiving element 342, a third transmitting element 344 and a fourth transmitting element 346. The first receiving element 340 and the second receiving element 342 are disposed corresponding to one of the third transmitting element 344 and the fourth transmitting element 346, respectively. Since the filtering wavelength of each filter is determined by the requirements of the receiving element and/or the transmitting element corresponding to the filter, only the angle of each filter is described in this case. The way of defining the filter angle is determined by the angle at which the light is incident on the filter. That is, in the passive optical network dual system module 3 described in this case, when the optical signal S (dotted line) is transmitted to the first filter 320, the incident angle of the optical signal S entering the first filter 320 is 45 degrees. When the optical signal S is transmitted to the second filter 322, the incident angle of the optical signal S entering the second filter 322 is 45 degrees. The third transmitting element 344 and the fourth transmitting element 346 are set corresponding to the combination third filter 328. Therefore, when the optical signal S is transmitted to the third filter 328, the incident angle of the optical signal S entering the third filter 328 is 45 degrees.

It should be noted that the optical signal in this case is not a single wavelength, and in the case of different wavelengths, if the optical signal is directly transmitted to the light guide unit, the optical signal may be disturbed and resulting in poor reception. Therefore, a first collimating lens and a second collimating lens are arranged in the passive optical network dual system module of the present case, and the two collimating lenses can make the optical signal form parallel light, which is convenient for the receiving element to receive.

In the passive optical network dual system module of the present invention, the first receiving element receives wavelengths ranging from 1575 nm to 1580 nm. The second receiving element has a receiving wavelength range from 1480 nm to 1500 nm. The third emission element has an emission wavelength range of 1300 nm to 1320 nm. The fourth emission element has an emission wavelength range of 1260 nm to 1280 nm. And the difference in emission wavelength range between the third emitting element and the fourth emitting element is not greater than 60 nm.

Using the passive optical network dual system module described in the present invention, the services of two communication protocol systems can be provided simultaneously in the same structure. For example, GPON (Gigabit-Capable Passive Optical network) can be served simultaneously with XGS-PON (10 Gigabit-Capable Symmetric Passive Optical network). Of course, the above communication system is only an example, and any communication system that can be applied to the passive optical network dual system module in this case should not go beyond the scope of the present invention.

Accordingly, the present invention discloses a passive optical network dual system module, and has the following advantages.

1. Combining dual-system components in the same module makes it unnecessary to disassemble additional hardware devices such as modems when replacing or using two communication systems at the same time, greatly reducing the cost of replacing the system.
2. Through the setting of the collimating lens, the optical signal can form parallel light, which improves the quality of the optical signal received by the receiver.
3. Through the design between the third filter and the fourth filter, the setting of the small angle not only greatly saves the overall space, but also reduces the problem of unstable optical signal caused by the light spot.

4. By the design of the combination filter, instead of requiring two filters to correspond to the receiver, not only the overall structure is simpler, but also the overall space is greatly saved, reducing the It solves the problem that the light spot causes the optical signal to be unstable.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. A passive optical network dual system module, comprising:
   a light guiding unit connected to an optical fiber and adapted to transmit an optical signal, and the optical signal is not a single wavelength;
   an optical path conversion unit, connected to the light guide unit, adapted to receive the optical signal and change the optical path of the optical signal, the light path conversion unit sequentially includes along a direction toward the light guide unit a first collimating lens, a first filter, a second filter, a second collimating lens, a third filter and a fourth filter, wherein the first collimating lens and the second collimating lens are causing the optical signal to form parallel light; and an optical transceiver unit, suitable for receiving and transmitting the optical signal, suitable for two sets of communication protocol systems, the optical transceiver unit includes:

a first receiving element, which is set corresponding to the first filter;

a second receiving element, which is set corresponding to the second filter;

a third emitting element, set corresponding to the third filter; and a fourth emitting element, which is set corresponding to the fourth filter;

wherein, the first receiving element and the second receiving element are respectively disposed corresponding to one of the third emitting element and the fourth emitting element;

wherein when the optical signal is transmitted to the third filter, the incident angle of the optical signal entering the third filter is 20 to 30 degrees; and wherein when the optical signal is transmitted to the fourth filter, the incident angle of the optical signal entering the fourth filter is 15 to 25 degrees.

2. The passive optical network dual system module according to claim 1, wherein when the optical signal is transmitted to the first filter, the incident angle of the optical signal entering the first filter is 45 degrees.

3. The passive optical network dual system module according to claim 1, wherein when the optical signal is transmitted to the second filter, the incident angle of the optical signal entering the second filter is 45 degrees.

4. The passive optical network dual system module as claimed in claim 1, wherein the first receiving element has a receiving wavelength range of 1575 to 1580 nm.

5. The passive optical network dual system module according to claim 1, wherein the second receiving element has a receiving wavelength range of 1480 to 1500 nm.

6. The passive optical network dual system module as claimed in claim 1, wherein the third emitting element emits a wavelength in the range of 1300 nm to 1320 nm.

7. The passive optical network dual system module according to claim 1, wherein the fourth emitting element has an emission wavelength range of 1260 nm to 1280 nm.

8. The passive optical network dual system module according to claim 1, wherein the difference in emission wavelength range between the third emitting element and the fourth emitting element is not greater than 60 nm.

* * * * *